C. T. SILVER.
STEERING WHEEL FOR AUTOMOBILES.
APPLICATION FILED FEB. 28, 1917.

1,329,934.

Patented Feb. 3, 1920.

WITNESSES

INVENTOR
C. T. Silver
BY
ATTORNEYS

UNITED STATES PATENT OFFICE.

CONOVER T. SILVER, OF NEW YORK, N. Y.

STEERING-WHEEL FOR AUTOMOBILES.

1,329,934.    Specification of Letters Patent.    Patented Feb. 3, 1920.

Application filed February 28, 1917. Serial No. 151,446.

*To all whom it may concern:*

Be it known that I, CONOVER T. SILVER, a citizen of the United States, and a resident of the city of New York, borough of Manhattan, county and State of New York, have invented a new and Improved Steering-Wheel for Automobiles, of which the following is a full, clear, and exact description.

My invention has for its object to provide a steering wheel for automobiles which will not obstruct the vision of the driver of the automobile, and which will not prevent the easy passage of the occupants of the automobile across the automobile in front of the steering wheel. To accomplish this, the steering wheel is constructed with its front much nearer the axis of the steering wheel than the sides and rear of the steering wheel.

Additional objects of the invention will appear in the following specification, in which the preferred form of the invention is disclosed.

In the drawings similar reference characters denote similar parts in all the views, in which—

Figure 1:
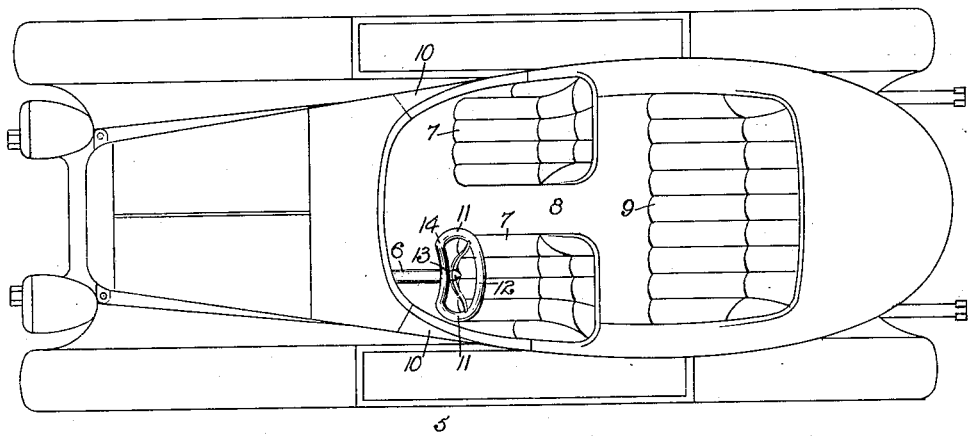
Figure 1 is a plan view of an automobile showing my improved steering wheel.
Figure 2:
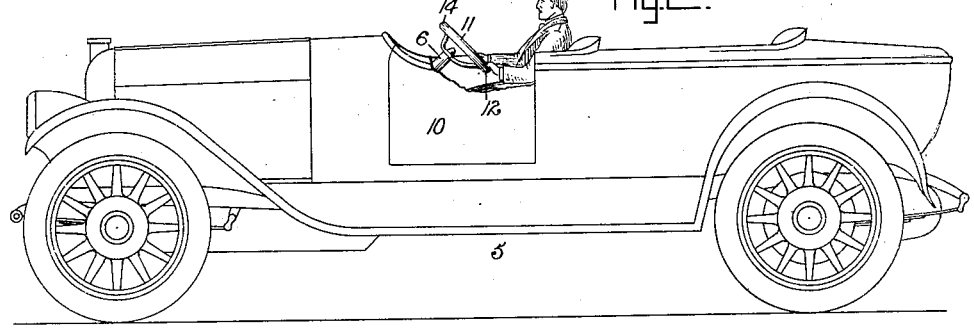
Fig. 2 is a side elevation of Fig. 1.
Figure 3:
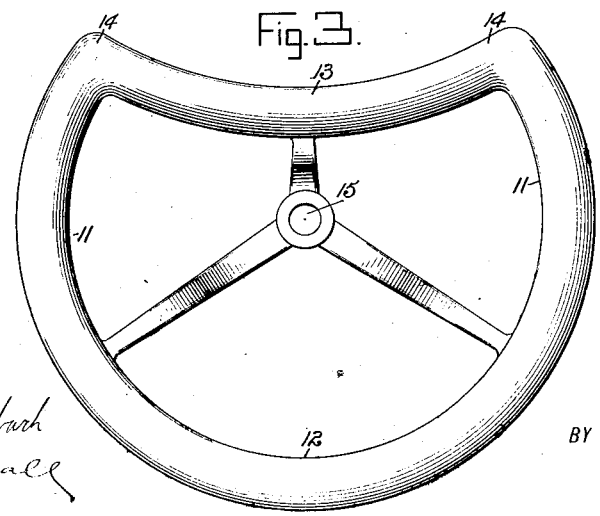
Fig. 3 is an enlarged view of the steering wheel.

By referring to Figs. 1 and 2 of the drawings, it will be seen that the steering wheel is used on an automobile 5 having a steering post 6 extending upwardly and rearwardly in the customary manner, this automobile 5 being constructed with its front sides 7 spaced apart to afford a passage 8 between the front seats to the rear seat 9. The automobile body has two front doors 10, one at each side, so that the passengers may enter the body of the automobile through either of the doors 10, depending on which side of the automobile may be nearest to the curb.

With this construction it is extremely important that the steering wheel be so constructed that it will not interfere with the free passage of the occupants of the automobile across the automobile in front of the steering wheel and to the central passage 8.

The sides 11 and the rear 12 of the steering wheel are of the usual shape, that is, the sides and rear of the steering wheel are convex so that the driver of the automobile may secure a firm grip and the necessary leverage for steering purposes; but the front 13 of the steering wheel is concave, so that it will not interfere with the free passage of the occupants of the automobile in front of the steering wheel, and also so that it will not obstruct the vision of the driver of the automobile, since, as will be seen by referring to Fig. 2 of the drawings, the driver of the automobile may look ahead without his vision being obstructed in any way by the steering wheel. As the front 13 of the steering wheel is concave, the sides 14 of the front portion 13 are disposed at a greater distance from the axis 15 of the steering wheel than is the center of the front portion 13, this construction extending forwardly the convex sides 11 of the steering wheel, so that the driver of the automobile may use the forward portions of the convex sides 11 in the usual manner, while securing the advantages set forth.

Having thus described my invention, I claim as new and desire to secure by Letters Patent:

1. In combination with a vehicle having a seat, a steering wheel comprising a continuous rim structure having a rear portion adjacent the seat concentric with the axis of the rim structure, and a non-concentric forward portion comprising a curved reëntrant part.

2. In combination with a vehicle having a seat, a steering post in front thereof, a steering wheel permanently secured to the post comprising a continuous rim structure having a rear portion adjacent the seat concentric with the axis of the post, and a forward portion comprising a reëntrant part.

3. In combination with an automobile body having a steering post extending rearwardly and upwardly and a door disposed at the side thereof, a steering wheel mounted on the steering post, constructed with its front portion nearer its axis than its side portions to afford a free passage from the door across the automobile in front of the steering wheel and to give the driver of the automobile a clear view of the road ahead close to the automobile and unobstructed by the steering wheel.

4. In combination with an automobile body having a steering post extending rearwardly and upwardly and a door disposed at the side thereof, a steering wheel mounted on the post, constructed with its side and rear portions convex and its front portion concave to afford a passage from the door across the automobile in front of the steering wheel and to give the driver of the automobile a clear view of the road ahead close to the automobile and unobstructed by the steering wheel.

5. A steering wheel comprising a continuous rim structure having a portion concentric with the axis thereof, and a non-concentric portion comprising a curved reëntrant part.

CONOVER T. SILVER.